(12) United States Patent
Brundisini et al.

(10) Patent No.: US 6,259,955 B1
(45) Date of Patent: Jul. 10, 2001

(54) PROGRAMMABLE ELECTRONIC CONTROL UNIT FOR AUTOMATIC WATERING SYSTEMS

(75) Inventors: Andrea Brundisini, Pordenone; Gianfranco Roman, Pasiano, both of (IT)

(73) Assignee: Claber S.p.A., Fiume Veneto (IT)

( * ) Notice: Subject to any disclaimer, the term of this patent is extended or adjusted under 35 U.S.C. 154(b) by 0 days.

(21) Appl. No.: 09/150,674

(22) Filed: Sep. 10, 1998

(30) Foreign Application Priority Data

Sep. 15, 1997 (IT) ............................................. MI97A2087

(51) Int. Cl.⁷ ................................................... G05B 11/01
(52) U.S. Cl. ................................ 700/15; 700/284; 239/69
(58) Field of Search .................................. 700/11, 14–18, 700/284, 83–84, 86, 87; 239/69, 70; 137/624.11, 624.2; 345/352, 353

(56) References Cited

U.S. PATENT DOCUMENTS

| | | | |
|---|---|---|---|
| 4,760,547 | * 7/1988 | Duxbury | 700/284 |
| 4,852,051 | * 7/1989 | Mylne, III | 700/284 |
| 5,097,861 | 3/1992 | Hopkins et al. | 137/78.3 |
| 5,262,936 | * 11/1993 | Faris et al. | 700/11 |
| 5,293,554 | 3/1994 | Nicholson | 364/420 |
| 5,337,957 | * 8/1994 | Olson | 239/63 |
| 5,444,611 | 8/1995 | Woytowitz et al. | 364/145 |
| 5,479,338 | 12/1995 | Ericksen et al. | 364/145 |
| 5,602,728 | 2/1997 | Madden et al. | 364/145 |
| 5,748,466 | * 5/1998 | McGivern et al. | 700/17 |

FOREIGN PATENT DOCUMENTS 0741346   11/1996  (EP) .

* cited by examiner

*Primary Examiner*—William Grant
*Assistant Examiner*—Zoila Cabrera
(74) *Attorney, Agent, or Firm*—Jacobson Holman, PLLC

(57) ABSTRACT

Electronic control unit comprising an electronic circuit with a programmable processing unit and operating buttons to execute and to vary manually the programming of the processing unit and a display for the visualization of the programming stages. The programmable processing unit is organized to individuate a programming menu that is subdivided into a plurality of parts selectionable at will. Each part comprising at least one chapter. The chapter being formed of at least one setting page of at least one respective programming parameter, and in that each part of the menu is directly selectionable by pressure on at least one respective operating button.

27 Claims, 5 Drawing Sheets

| PART | CHAPTER | n. PAGES | PAGES |
|---|---|---|---|
| PROGRAM A | RUN TIMES | 13 | Watering time length Line 1-Line 12, MV |
| | START TIMES | 4 | Starting times |
| | DAY SCHEDULE | 8+1 | Sunday - Saturday, Cycle length/Current day |
| PROGRAM B | RUN TIMES | 13 | Watering time length Line 1-Line 12, MV |
| | START TIMES | 4 | Starting times |
| | DAY SCHEDULE | 8+1 | Sunday - Saturday, Cycle length/Current day |
| PROGRAM C | RUN TIMES | 13 | Watering time length Line 1-Line 12, MV |
| | START TIMES | 4 | Starting times |
| | DAY SCHEDULE | 8+1 | Sunday - Saturday, Cycle length/Current day |
| MANUAL | SEMI-AUTO PR-A | 1 | Enabled/Disabled |
| | SEMI-AUTO PR-B | 1 | Enabled/Disabled |
| | SEMI-AUTO PR-C | 1 | Enabled/Disabled |
| | MANUAL STATION | 13 | It sets manual operating length/Enabled/Disabled |
| | TEST | 1 | It sets testing length/Enabled/Disabled |
| SETTING | CURRENT TIME | 1 | It sets hours and minutes |
| | CALENDAR | 1÷1 | It sets year/It sets day and month |
| | ODD/EVEN | 1 | It enables watering on even or odd days |
| | SENSOR PR-A | 1 | It sets sensor functions for Program A |
| | SENSOR PR-B | 1 | It sets sensor functions for Program B |
| | SENSOR PR-C | 1 | It sets sensor functions for Program C |
| BUDGET | BUDGET PR-A | 1 | It sets budget function for Program A |
| | BUDGET PR-B | 1 | It sets budget function for Program B |
| | BUDGET PR-C | 1 | It sets budget function for Program C |
| STOP | DAYS OFF | 1 | It sets a number of days of watering interruption |
| RUN/ACTIVITY | CURRENT TIME | 1 | Current time and day, active watering lines, short circuits |
| | ACTIVITY PR-A | 1 | Active watering lines Program A, Residual watering time |
| | ACTIVITY PR-B | 1 | Active watering lines Program B, Residual watering time |
| | ACTIVITY PR-C | 1 | Active watering lines Program C, Residual watering time |

FIG.4

PROGRAMMABLE ELECTRONIC CONTROL UNIT FOR AUTOMATIC WATERING SYSTEMS

BACKGROUND OF THE INVENTION

Field of the Invention

The present invention refers to a programmable electronic control unit for automatic watering systems, preferably for watering systems with plural lines.

For the maintenance of lawns, gardens, kitchen gardens and other cultivated spaces, the employment of automatic watering systems controlled by a programmable electronic control unit is increasingly widespread.

The control unit can be either of a simple type capable to control one watering system, for instance with one single line, on the bases of watering programs pre-set by the producer, that the user can only select according to his/her own needs, or of a more complex type, both in terms of performance and number of lines, and to offer the user the possibility to program the control unit on his/her own.

It is quite clear that in this latter case the easiness of programming becomes a primary need, such as to decisively influence the choice in the purchase of the control unit.

SUMMARY OF THE INVENTION

Object of the present invention has therefore been to realise a controlling electronic control unit for watering systems that would be easily and quickly programmed by the user.

According to the invention, such object has been attained by means of an electronic control unit comprising an electronic circuit with a programmable processing unit, operating buttons to execute and to vary the programming of said processing unit and a display for the visualisation of the programming stages. The programmable processing unit is organized to individuate a programming menu that is subdivided into a plurality of parts selectionable at will. Each part comprising at least one chapter. The said chapter being formed of at least one page of setting for at least one respective programming parameter, and in that each part of the menu is directly and independently selectionable by pressing on at least one respective operating button.

The subdivision of the programming menu into several parts, each one directly and independently selectionable by means of at least one respective operating button, and of each part into one or more chapters makes the operation of the control unit programming extremely simple, allowing in addition to accede only to those programming functions that one wishes to set or to modify.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled.

BRIEF DESCRIPTION OF THE DRAWINGS

The characteristics and the advantages of the present invention will be rendered more evident in the following detailed description of a possible embodiment thereof, which is illustrated as a non-limiting example in the enclosed drawings, in which:

FIG. 4 shows schematically the organisation of the control unit programing menu;

DESCRIPTION OF THE INVENTION

Figure 1:
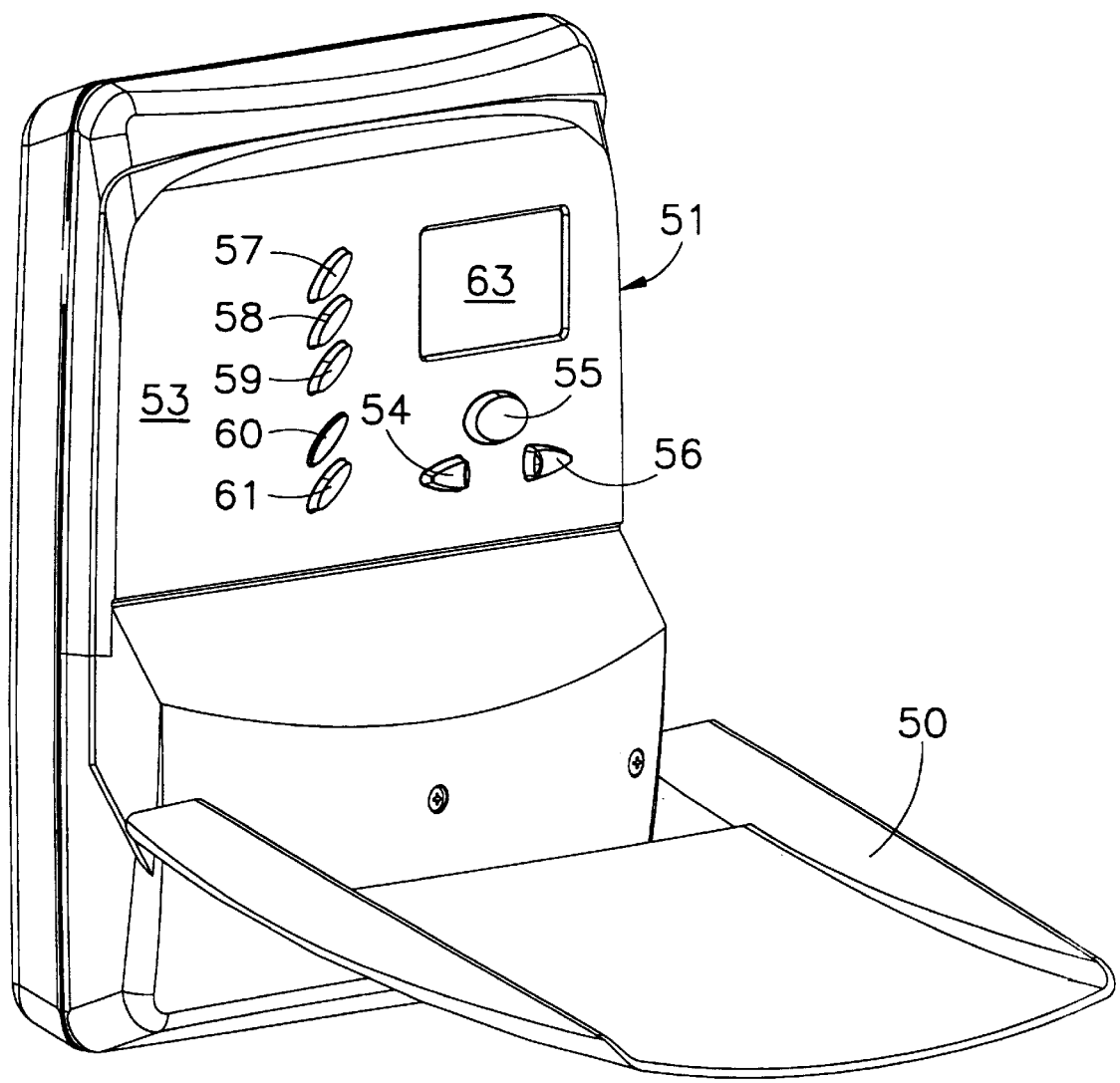
FIG. 1 shows in a perspective view an embodiment of a control unit according to the invention.

The control unit shown in FIG. 1 has a box casing 51 of an approximately parallelepiped shape, inside which an electronic circuitry is housed, that comprises, among others, an electronic circuit with a programmable processing unit, various input and output wires associated with a terminal board (not shown) and with a buffer battery. According to a variation, the box casing 51 can also serve as a housing for an electric transformer capable to reduce the input tension of the power of mains.

On one upper face 53 of the box casing 51 operating buttons 54–61 are present. The buttons 54÷56 are located substantially below a display 63, while the buttons 57÷61 are lined up on one side of the display 63. Hereinafter, the buttons 54÷61 will be designated by using the nomenclature listed below (nomenclature that preferably corresponds to graphic indications that are inscribed on the face 53 beside the same buttons):

button 54: "−"
button 55: "ENTER"
button 56: "+"
button 57: "PROGRAM A"
button 58: "PROGRAM B"
button 59: "PROGRAM C"
button 60: "SETTING"
button 61: "MANUAL"

Figure 3:
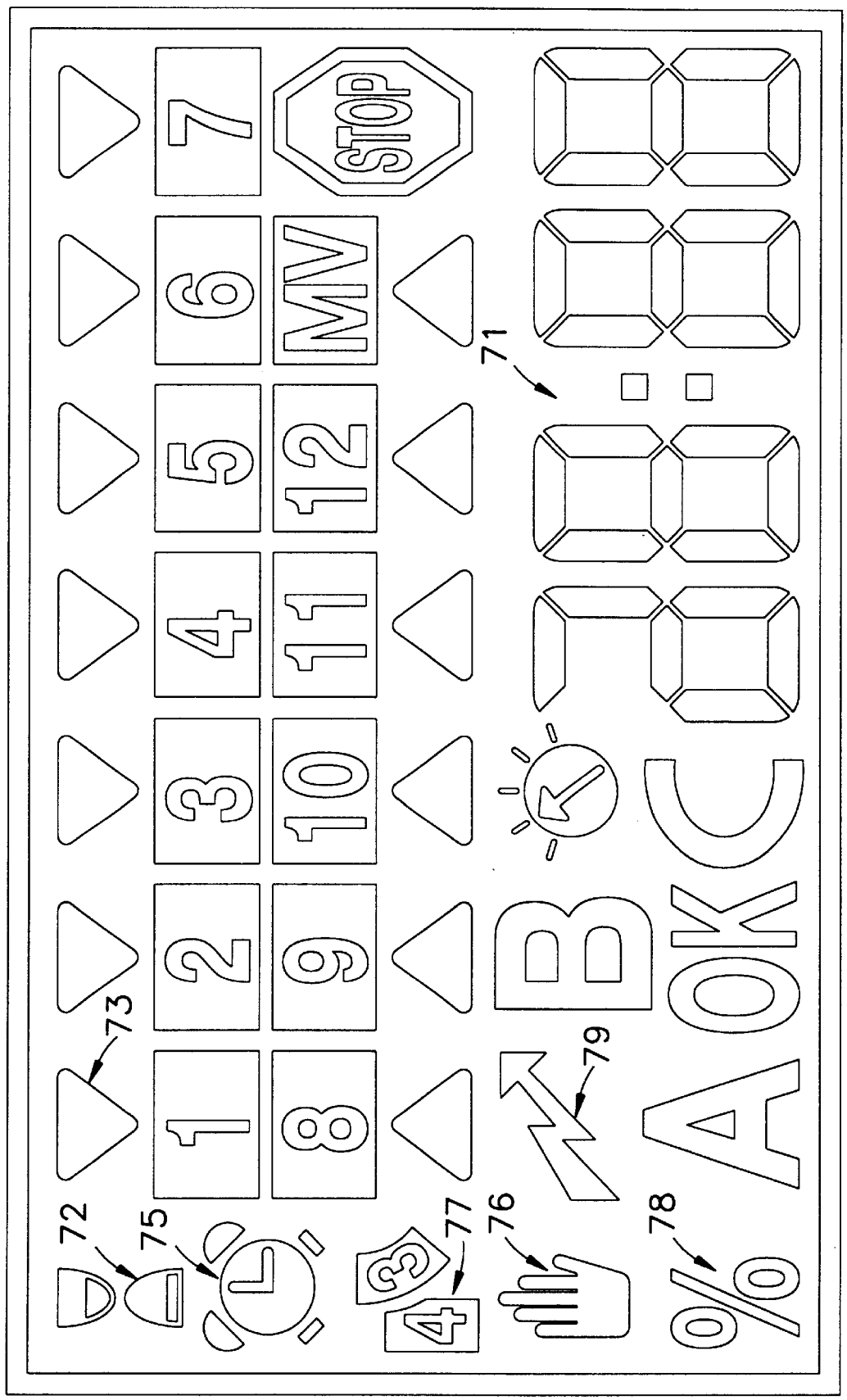
FIG. 3 shows the set of symbols that appear on the control unit display in the course of the various programming stages of the same.

The display 63 is destined to the visualisation of a series of symbols, that are indicative of the programming stage under course, as well as of the current time and of other set functions that will be illustrated, together with the meaning of the various symbols illustrated as a whole in FIG. 3, further on in this description.

A transparent lid 50 is hinge coupled to the box casing 51 in order to be overlapped to the upper face 53 of the box casing itself as a protection for the operating buttons and of the display, and at the same time to be opened as shown in FIG. 1 at the time of programming.

Figure 2:
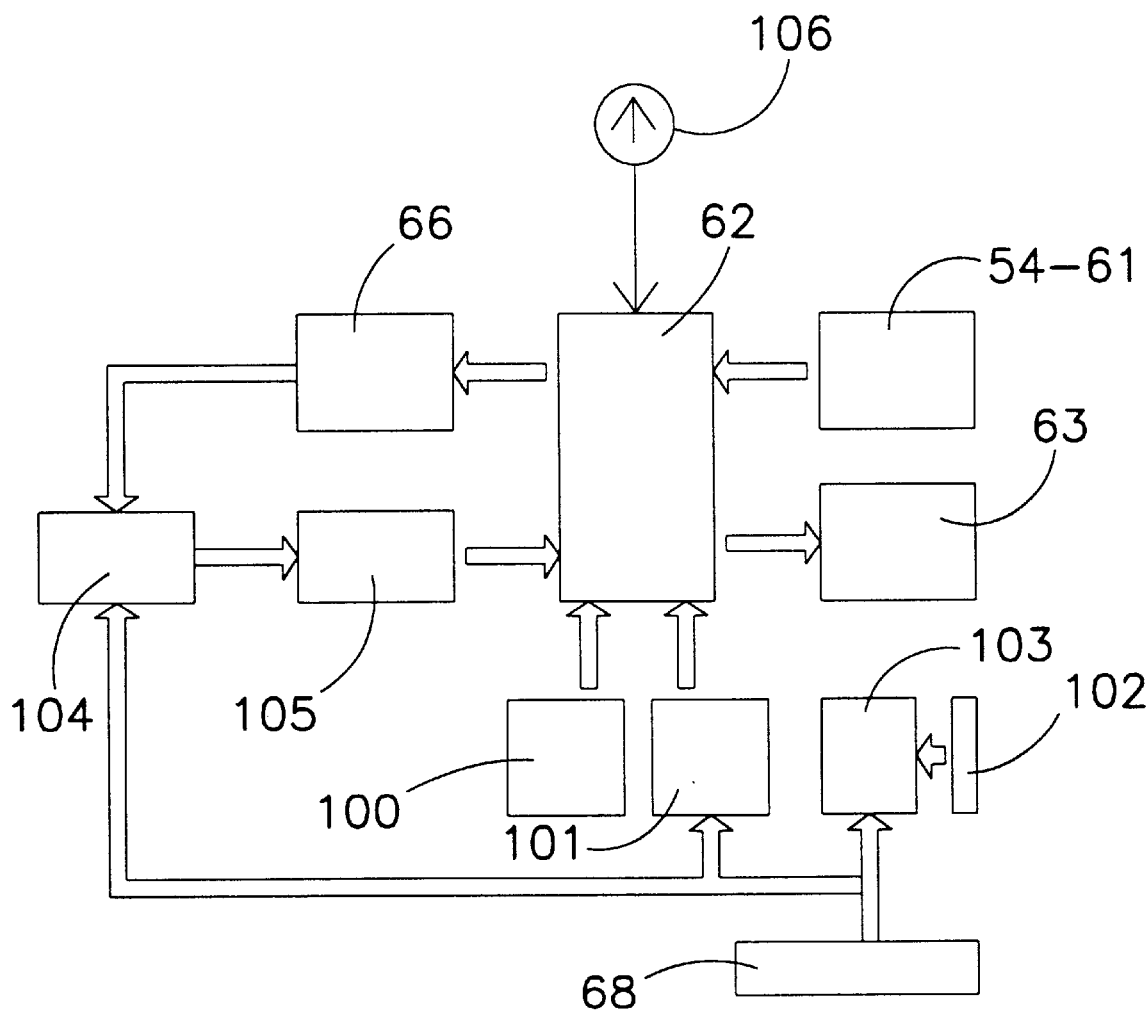
FIG. 2 shows a block scheme representative of the electronic circuit of the control unit.

FIG. 2 shows a possible scheme of functional blocks of the electronic circuit of the control unit, that comprises essentially a programmable processing unit with microprocessor 62 controlled by operating buttons 54÷61 and controlling in turn the display 63. In addition, the processing unit 62 is controlled by a pair of predisposition selectors 100 (not shown in FIG. 1) that provide for the selection of the number of outputs to control (for example 6 or 8 or 10 or 12) and for the selection of the input frequency (for example 50 Hz or 60 Hz), and it receives a low tension alternated power supply (for example, 24 VAC) from a transformer 68 through which a synchronism circuit 101 is piloted. The transformer 68, or as an alternative a buffer battery 102, provides also for the supply of the electronic circuitry 103 necessary for the generation of the tensions required for the operation of the electronic components, among which is the processing unit 62.

The processing unit 62 also provides for the control of a pilot circuit 66 for the electro-valves 104 controlling the various lines of the watering system supplied by the transformer 68. A circuit of short circuit detection 105 individuates and turns off the line possibly interested by the short circuit.

The processing unit is also connected with a sensor 106.

The processing unit 62 is organized in such a way as to individuate a programming menu realised as a book subdivided into several part. Each part being in turn subdivided into several chapters selectionable at will, each chapter being formed by several pages that are explorable and programmable in a sequence.

More precisely, with reference to FIG. 4, a first part of the menu PROGRAM A refers to a first watering program A, a second part of the menu PROGRAM B refers to a second watering program B, a third part of the menu PROGRAM C refers to a third watering program C. A fourth part of the menu MANUAL refers to a functions of manual activation, of testing, of semi-automatic operation according to programs A, B and C. A fifth part of the menu SETTING refers to functions of setting of the current time, year, month, day of the setting of watering only on even or odd days, and of the setting of the functions of the sensor 106. A sixth part of the menu BUDGET refers to functions of increase or decrease percentage variation of set watering times (function that will become more clear further on). A seventh part of the menu STOP refers to a function of arrest of the watering, for example in case of rain. Finally, an eighth part of the menu RUN/ACTIVITY refers to functions of visualisation of information about the state of the activities under course as current time and day, residual watering times etc., on the display 63.

The aforementioned various parts of the menu will be now described in detail, together with the control unit programming procedure.

In general, starting from a condition of programming standby or, in case of modification, from a condition of normal operation in which the display 63 visualises only the current time and day through segment numeric symbols 71 and one of the numeric indicators from 1 to 7 of FIG. 3, in order to accede to one part of the programming menu it is sufficient to press the relative button 57÷61 (for the parts PROGRAM A, PROGRAM B, PROGRAM C, MANUAL, SETTING) or the simultaneous combination of buttons 54 and 55 for the BUDGET part, 55 and 56 for the STOP part, 54 and 56 for the RUN/ACTIVITY part. Normally, when one accedes to a part of the programming menu, the current chapter is the fist one in the list of chapters in the relative part; in order to select a different chapter within that part, it is necessary to repeatedly press the button, or the simultaneous combination of buttons, which allowed to accede to the relative part of the menu. At each pressure on the aforementioned button or on the aforementioned combination of buttons one advances by one chapter within that part. Similarly, when one selects a chapter within a part, the current page is the first one in the list in the pages of the relative chapter. This is visualised by the lighting of the arrow shaped cursor 73 over the symbol "1" on the display. In order to select a different page it is necessary to press buttons 54 or 56 ("−" or "+") repeatedly. At each pressure on the button or "−" of the button "+" one advances or respectively or moves back by one page within the chapter; the current page number is indicated by the arrow shaped cursor 73 that moves accordingly over the symbols "2", "3" etc. Once the desired page has been selected, in order to modify the programming parameter associated with it it is necessary to press the button 55 ("ENTER"): on the display the symbol "OK" will appear, and by pressing the buttons 54 ("−") or 56 ("+") it is possible to modify the value of the parameter until the desirable value is reached; at this point the value being set is operating. By pressing the button 55 again one exits the stage of modification of the parameters. It should be noted that it is not possible to select a part of the programming menu while in the process of modifying any one programming parameter, that is while the symbol "OK" is visualised on the display.

The first three parts of the menu, each one referring to a respective watering program A, B or C, each comprise three chapters, respectively relative to watering time ("RUN TIMES"), to the starting instant of the watering ("START TIMES") and to the days of the week in which the relative watering program must be activated ("DAY SCHEDULE"). By pressing the button 57 one accedes to the part PROGRAM A. The current chapter is the one called RUN TIMES, and this is visualised on the display by the lighting of the sandglass symbol 72. This chapter comprises thirteen pages, the first twelve of which are associated with the twelve watering lines and the thirteenth associated with a control line of a main valve ("master valve") or of a pump. The page that is current when one accedes to the chapter RUN TIMES is the first one, associated with the first watering line. In order to select a different watering line it is necessary to pass to a different page of the chapter by pressing the button 54 or the button 56. Once the desirable watering line, or the line devoted to the master valve (symbol "MV" on the display), has been selected, in order to set or to modify the watering time for such line, or to enable or not the master valve, the button 55 must be pressed: the symbol "OK" lightens, and through the buttons 54 and 55 it is possible to set the desirable watering time; by pressing again the button 55 one exits the setting stage of the watering time for the line being selected. The same operation can be repeated for all the remaining watering lines, by selecting the relative pages.

By pressing again the button 57 one passes on to the second chapter of the part PROGRAM A, that is the chapter START TIMES. This chapter comprises four pages, each one relating to a respective starting time of watering of the various lines for the watering program A. When one accedes to this chapter the symbol visualised on the display is the alarm clock 75. Once more, by means of the buttons 54 and 56 it is possible to scroll the pages of this chapter. Once the desirable chapter has been reached, in order to modify the time of the watering start one must press the button 55, modify the value by means of the buttons 54 and 65, and press again the button 55 in order to exit the setting stage.

By pressing again the button 57 one accedes to the third chapter DAY SCHEDULE of the part PROGRAM A. The symbol of calendar pages 77 will be visualised on the display. This chapter comprises eight pages plus a sub-page. The first seven pages each refer to a day of the week, while the eighth one refers to the activation of the daily cyclic programming. In order to select one of the eight pages one proceeds according to what described above, by means of the buttons 54 and 56. By selecting one of the seven pages of the chapter and by pressing the button 55, it is possible to enable/disable the watering of the day of the week that such page refers to. If as an alternative one wishes to enable the function of cyclic daily watering, that allows to water one day every "n" of days with n settable from 1 to 12, it is necessary to select the eighth page. Automatically the sub-page is then also selected which allows to specify which one will be the day of the beginning of the cycle.

For the setting of the other two watering programs B and C one proceeds in a totally analogous way.

In order to allow the user an easier and quicker verification and check of the parameters being set for the three watering programs, when one is inside a certain page of a certain chapter of one of the first three parts of the menu, for example part PROGRAM A, one accedes directly to the corresponding chapter and to the corresponding page of the other two parts PROGRAM B and PROGRAM C by pressing respectively the buttons 58 or 59, in such a way that the user can easily check and verify the parameters being set for the different watering programs.

The fourth part of the menu indicated in FIG. 4 with MANUAL is accessible by means of pressing the button 61 and it comprises five chapters. The first three chapters, SEMI-AUTO PR-A, SEMI-AUTO PR-B, SEMI-AUTO PR-C, each composed of one single page, consent to activate immediately if disabled or to disable if enabled the watering program A, B, and C respectively. This is obtained, after having accessed to this part of the menu as described above, and having selected the desirable chapter always by means of pressure on the button 61 by pressing the button 55 (ENTER). The access to this part of the menu causes the lighting of the hand symbol 76 on the display, while the current chapter is indicated by the lighting of the relative symbol A, B or C on the display. The fourth chapter identified as MANUAL STATION consists of thirteen pages, the first twelve relating to the twelve watering lines and the thirteenth one relating to the master valve. This chapter allows the opening of one of the twelve electro-valves associated with the twelve watering lines for a determined time with the master valve enabled or not. The selection of this chapter is made according to the described procedures, by means the repeated pressure on button 61, and the selection of the desirable page within the chapter, associated with the watering line that one wants to control or with the master valve, is accomplished through the repeated pressure on the two buttons 54 and 56; the indication of the current page on the display is obtained by means of the arrow shaped cursor 73. Once the current page has been selected, at a first pressure on the button 55 (ENTER) one accedes to the setting of the desirable time, at a second pressure on the button 55 (ENTER) the electro-valve opens, if this was closed, and it closes if it was open. The fifth chapter of this part, called TEST, comprises one single page and it allows to get the control unit in condition to run a test on the system, by activating all the lines in a sequence for a variable length of time that is settable by the user. The selection of this chapter is still accomplished by means of the repeated pressure on button 61. Once one gets to this chapter, a first pressure on button 55 (ENTER) allows to set the desirable time length, while a second pressure on button 55 starts the testing. In case the test had been activated, at the first pressure on button 55 it would immediately be disabled.

The fifth part of the menu, indicated by SETTING in FIG. 4, is accessible by means of pressure on button 60 and it comprises six chapters, that can still be scrolled by means of button 60. The first chapter, identified as CURRENT TIME, comprises only one page and it allows to set the time. To this purpose, by pressing the button 55 the symbol "OK" appears and the symbol 71 shows the current memorised time; by pressing the buttons 54 and 56 it is possible to modify the currently memorised time. The second chapter, identified as CALENDAR, comprises one page and a sub-page and it allows to set the current year, and day and month; to this purpose, after having selected the chapter, it is necessary to press the button 55; on the display the symbol "OK" appears and the symbol 71 shows the year currently memorised; by means of the buttons 54 and 56 it is possible to modify the year; the pressure on the button 55 allows to accede to the sub-page that allows, by means of the buttons 54 and 56, to modify the day and the month; and the pressure on button 55 causes the exit from the setting stage. The third chapter, identified as ODD/EVEN comprises one single page that allows the even and odd programming, that takes into account also the leap year. By pressing the button 55 one accedes to the page and by means of the buttons 54 and 56 it is possible to select one of three possible conditions: watering during odd days (on the display four figures "1" will appear), watering during even days (on the display four figures "2" will appear) and OFF (to indicate that the function odd/even days is not enabled). It should be noted that the enabling of the function odd/even days automatically excludes the previously described weekly and cyclic programming. The third, fourth and fifth chapter of this part of the menu, respectively identified with SENSOR PR-A, SENSOR PR-B and SENSOR PR-C, to which one accedes as usual by means of repeated pressure on button 60, allow to associate the sensor 106 respectively with program A, with program B or with program C. Each one of the chapters comprises one page, that is selected by means of pressure on the button 55, and within which it is possible to set one among four operating modes of the sensor: start, stop, feeding to the next watering line, getting the watering system into a state of standby if for example a possible reservoir from which the water comes is detected as being empty.

The sixth part of the programming menu BUDGET, to which one accedes by means of the simultaneous pressure on buttons 54 ("−") and 55 ("ENTER"), comprises three chapters, respectively identified with BUDGET PR-A, BUDGET PR-B and BUDGET PR-C, each one formed by one page, that allow to vary proportionally the watering times that have been set for the watering programs A, B and C, respectively, from 100% to 150% (increase) or to 10% (decrease). The selection of the chapter within the part is still attained by the repeated pressure on the combination of buttons 54 and 55. Once one gets to the current chapter, in order to accede to the respective programming page one presses the button 55 (ENTER), and through the buttons 54 and 56 the desirable percentage is set. On the display the "%" symbol 78 and the indicative number of the currently set percentage are visualised. By pressing again the button 55 one exits the setting stage. It should be noted that when in one of the first three parts of the menu PROGRAM A, PROGRAM B, PROGRAM C, by pressing simultaneously the buttons 54 and 55 it is possible to enter directly the percentage variation mode of the watering times of the program of provenience.

The seventh part of the programming menu, indicated with STOP, is accessible by means of the simultaneous pressure on the combination of buttons 55 (ENTER) and 56 ("+") and it comprises one single chapter called DAYS OFF, itself comprising one single page. By pressing the button 55 one enters the programming page, in which by means of the buttons 54 and 56 it is possible to set for how many days, in a number that is variable from 1 to 15, one wishes to inhibit the watering, for example because of rain. Bu pressing again the button 55 one exits the setting stage.

Finally, the eight part RUN/ACTIVITY of the programming menu, to which one accedes by means of the simultaneous pressure on the combination of buttons 54 and 56

("−" and "+") is composed of four chapters, each one comprising a single page. This part does not refer to a real programming mode of the control unit, but it allows to visualise some information about the state of the same on the display. As usual the chapters are scrollable by means of the repeated pressure on buttons 54 and 56. The first chapter, called CURRENT TIME, allows the visualisation on the display of the current time and of the current day or of the symbols relative to all the available stations, in case of active stations, indicated in turn by the presence of the arrow shaped cursor 73. The stations possibly afflicted by short circuit are visualised by means of flashing of the relative symbol, and of the symbol 79. The second, the third and the fourth chapters of this part, identified respectively by ACTIVITY PR-A, ACTIVITY PR-B and ACTIVITY PR-C, allow the visualisation of the watering lines currently enabled on behalf of the program A, B or C, respectively, as well as the residual watering time before turn off The above described control unit can be embodied in a slightly modified form, still according to the main principles of the present invention.

Figure 5:
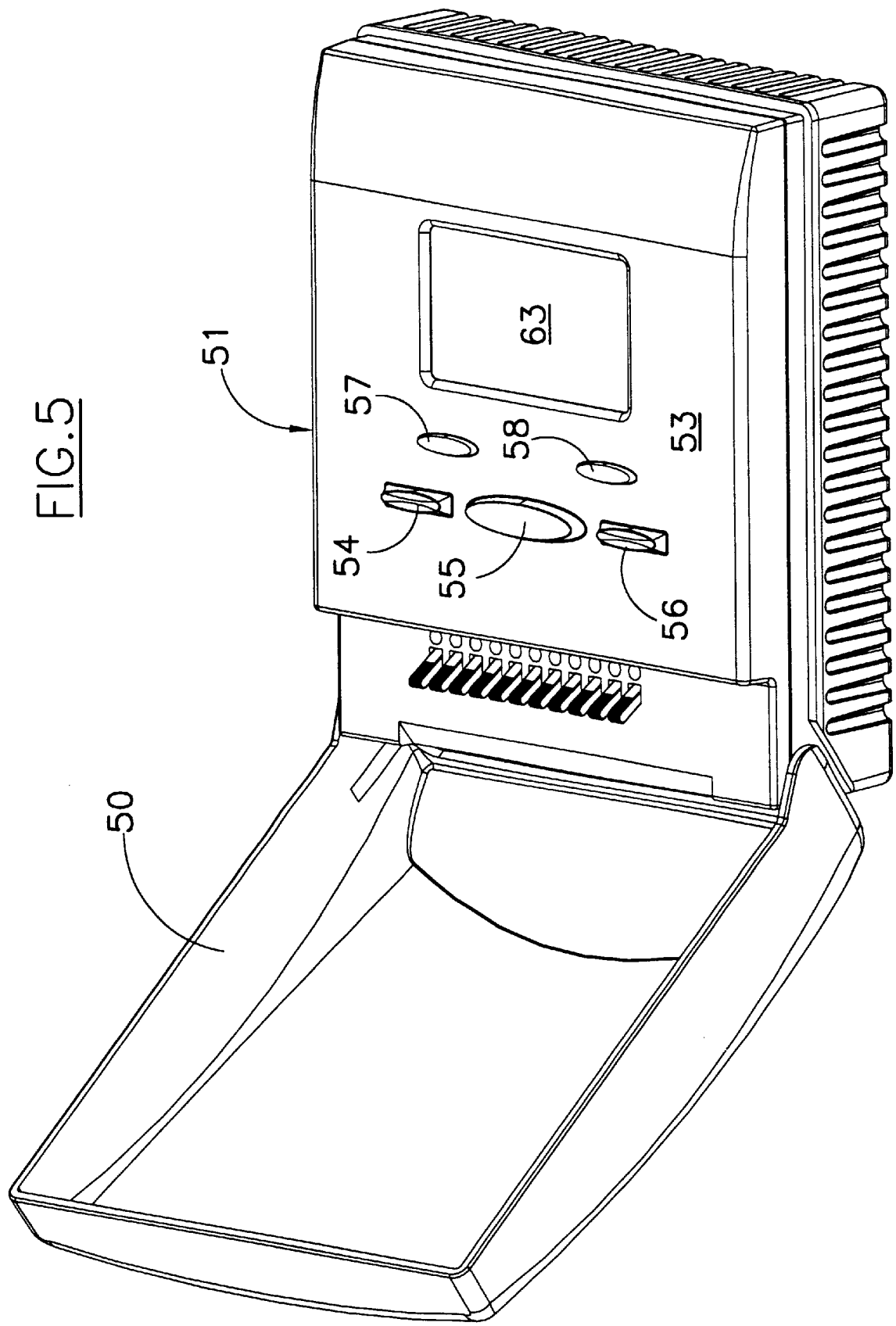
FIG. 5 shows in a perspective view another embodiment of the control unit according to the invention.

According to such an embodiment the buttons 59, 60 and 61 of FIG. 1 are eliminated and the remaining buttons are properly repositioned as illustrated in Fig.5.

On the operational point of view the control unit of FIG. 5 distinguishes from the preceding one in that it does not include the PROGRAM C program actuated by the button 59 of the control unit of FIG. 1.

The SETTING function is actuated by pressing the button 58 five seconds: one entered the function, the same button 58 operates in the same way as the button 60 of FIG. 1.

The MANUAL function is obtained by pressing the buttons 54 and 56 simultaneously.

There is provided an EXIT function which is actuated by pressing the buttons 57 and 58 simultaneously.

There is not provided a SENSOR function as that instead present in the control unit of FIG.1.

The BUDGET function has an increase of 25% and goes from 0% (OFF) to 200%.

There is finally provided a function which allows to save the programming data in an internal non-volatile memory: such an operation is carried out by actuating the EXIT function, that is by pressing the buttons 57 and 58 simultaneously, for 10 seconds. In case of simultaneous absence of mains and cell voltage, the saved program is automatically restored when the inconvenience ceases.

What is claimed is:

1. An electronic control unit for watering lines, comprising:

an electronic circuit with a programmable processing unit, operating buttons for programming said processing unit;

a display for visualization of programming steps;

said programmable processing unit provided with a programming menu divided into a plurality of selectable parts;

said selectable parts including watering program parts corresponding to respective independent watering programs;

each said watering program part including a plurality of selectable chapters corresponding to respective programmable watering functions of a watering program;

each of said selectable chapters including a plurality of selectable pages corresponding to respective programmable parameters of a watering function of the watering program;

said operating buttons including a plurality of first buttons for selecting said watering program parts and for moving sequentially through the chapters of said selectable watering program part to select one of said selectable chapters, a plurality of second buttons for moving fore and back through the pages of the selectable chapter to select one of said plurality of selectable pages of the selectable chapter, and a third button for entering and exiting from said selected page, said second buttons being also operable for increasing and decreasing the parameters of the selected page.

2. The electronic control unit according to claim 1, wherein each program part includes a first chapter for watering run time selection, a second chapter for watering start time selection and a third chapter for watering day schedule selection.

3. The electronic control unit according to claim 2, wherein said first chapter includes a plurality of pages including watering run time parameters for respective watering lines.

4. The electronic control unit according to claim 2, wherein said second chapter includes a plurality of pages including watering start time parameters for said watering lines.

5. The electronic control unit according to claim 2, wherein said third chapter includes a number of pages with watering enable/disable parameters for said watering lines, said number being equal to the number of days in a week.

6. The electronic control unit according to claim 5, wherein said third chapter includes a further page for actuating a daily cyclic watering program for said watering lines.

7. The electronic control unit according to claim 1, wherein said selectable parts include a manual watering part and said operating buttons include a fourth button for selecting said manual watering part.

8. The electronic control unit according to claim 7, wherein said manual watering part includes a plurality of selectable chapters which are selectable by operation of said first button.

9. The electronic control unit according to claim 8, wherein said selectable chapters include first chapters composed of one page for enabling/disabling a respective watering program by operation of said third button.

10. The electronic control unit according to claim 8, wherein said selectable chapters further include a second chapter composed of a number of selectable pages for setting watering parameters of respective valves for controlling the watering lines, said selectable pages being selectable by operation of said second buttons and said watering parameters being set by operation of said third button.

11. The electronic control unit according to claim 8, wherein said selectable chapters further include a third chapter composed of one page for testing sequentially the watering lines.

12. The electronic control unit according to claim 1, wherein said selectable parts include a setting part and said operating buttons include a fifth button for selecting said setting part.

13. The electronic control unit according to claim 12, wherein said setting part includes a plurality of selectable chapters which are selectable by operation of said fifth button.

14. The electronic control unit according to claim 13, wherein said selectable chapters include a current time chapter composed of one page which is selectable by operation of said third button, said one page including current time parameters which can be changed by operation of said second buttons.

15. The electronic control unit according to claim 13, wherein said selectable chapters include a current time chapter composed of one page which is selectable by operation of said third button, said one page including current time parameters which can be changed by operation of said second buttons.

16. The electronic control unit according to claim 13, wherein said selectable chapters include an odd/even chapter composed of one page which is selectable by operation of said third button, said one page including even/odd day parameters which can be changed and enabled/disabled by operation of said second buttons.

17. The electronic control unit according to claim 13, wherein said selectable chapters include a plurality of sensor chapters for associating a sensor to a respective watering program, each sensor chapter being composed of one page which is selectable by operation of said third button, said one page including a plurality of sensor operating modes which can be set by operation of said second buttons.

18. The electronic control unit according to claim 1, wherein said selectable parts include a budget part which can be accessed by simultaneous operation of said third button and one of said second buttons.

19. The electronic control unit according to claim 18, wherein said budget part includes a plurality of selectable chapters which are selectable by simultaneous operation of said third button and said one of said second buttons, each selectable chapter being composed of one page which is selectable by operation of said third button, said one page including watering time parameters which can be changed by operation of said second buttons.

20. The electronic control unit according to claim 1, wherein said selectable parts include a watering stop part which can be accessed by simultaneous operation of said third button and one of said second buttons.

21. The electronic control unit according to claim 20, wherein said stop part includes a days-off chapter composed of one page which can be entered by operation of said third button for setting watering inhibition days by operation of said second buttons.

22. The electronic control unit according to claim 1, wherein said selectable parts include a run/activity part which can be accessed by simultaneous operation of said third button and one of said second buttons.

23. The electronic control unit according to claim 22, wherein said run/activity part includes a plurality of selectable chapters which are selectable by simultaneous operation of said third button and one of said second buttons.

24. The electronic control unit according to claim 23, wherein said selectable chapters include a current time chapter composed of one page for displaying current time, current days and available watering lines.

25. The electronic control unit according to claim 23, wherein said selectable chapters include a plurality of watering line displaying chapters for displaying the currently enabled watering lines and the residual watering time thereof.

26. The electronic control unit according to claim 1, wherein said selectable parts include an exit part for a program output function which can be actuated by simultaneous operation of two buttons of said first buttons.

27. The electronic control unit according to claim 26, wherein said program output function includes saving of programming data in a non-volatile memory.

* * * * *